United States Patent
Kang et al.

(10) Patent No.: US 7,446,481 B2
(45) Date of Patent: Nov. 4, 2008

(54) DISPLAY DEVICE AND CONTROL METHOD THEREOF

(75) Inventors: Jeong-il Kang, Yongin-si (KR);
Sang-hoon Lee, Ulsan-si (KR);
Chang-wan Hong, Yongin-si (KR);
Yung-jun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 11/503,280

(22) Filed: Aug. 14, 2006

(65) Prior Publication Data
US 2007/0063937 A1    Mar. 22, 2007

(30) Foreign Application Priority Data
Sep. 16, 2005    (KR) ................. 10-2005-0086660

(51) Int. Cl.
*H05B 37/00*    (2006.01)

(52) U.S. Cl. .................. 315/185 R; 315/291; 315/307

(58) Field of Classification Search ................. 315/291, 315/294, 307, 185 R, 186, 189
See application file for complete search history.

(56) References Cited

U.S. PATENT DOCUMENTS

| | | | |
|---|---|---|---|
| 6,690,146 B2 | 2/2004 | Burgyan et al. | |
| 7,088,059 B2 * | 8/2006 | McKinney et al. | 315/291 |
| 7,262,559 B2 * | 8/2007 | Tripathi et al. | 315/291 |
| 2004/0233144 A1 | 11/2004 | Rader et al. | |

FOREIGN PATENT DOCUMENTS

| | | |
|---|---|---|
| JP | 2002-008409 | 11/2002 |
| KR | 10-2004-0084004 | 10/2004 |

* cited by examiner

*Primary Examiner*—David Hung Vu
(74) *Attorney, Agent, or Firm*—Roylance, Abrams, Berdo & Goodman, L.L.P.

(57) ABSTRACT

A display device and method for supplying stable electric power for a light source are provided. A display device comprises a plurality of light sources, a variable electrical power supply which supplies electric power for the light sources, a switching unit which is connected in series with the light sources, and a controller which controls the variable electrical power supply so that voltage across both ends of the switching unit is consistently held in relation to voltage across both ends of the light sources.

18 Claims, 6 Drawing Sheets

DISPLAY DEVICE AND CONTROL METHOD THEREOF

CROSS-REFERENCE TO RELATED APPLICATIONS

This application claims the benefit under 35 U.S.C. §119(a) of Korean Patent Application No. 2005-0086660, filed on Sep. 16, 2005, in the Korean Intellectual Property Office, the entire disclosure of which is hereby incorporated by reference.

BACKGROUND OF THE INVENTION

1. Field of the Invention

The present invention relates to a display device. More particularly, the present invention relates to a display device of a DLP (Digital Lighting Processing) system where drive current which is controlled in a linear mode is supplied to a light source.

2. Description of the Related Art

In current display devices, light sources for improved color reproduction are changed from systems using conventional CCFLs (Cold Cathode Fluorescent Lamps) to systems using LEDs (Light Emitting Diodes). As described above, the display device with a light source using LEDs enhances color reproduction performance.

In the case of a DLP system, an image is divided into several sheets of bit-planes with respectively different lengths in time. The divided sheets of the bit-planes are sequentially displayed on a screen. Accordingly, in a display device comprising a DLP system, the intensity of light corresponding to each bit-plane should be uniform. When the intensity of light corresponding to each bit-plane is not uniform, linearity in a gradation of an image displayed on a DLP display device becomes bad, or a gradation becomes unstable. Accordingly, in order to use LEDs as a light source in a DLP display device, current flowing through LEDs should be precisely controlled so that noise such as switching pulsation is suppressed. As a bit-plane is varied, a current value required for current flowing through LEDs is varied. Since a transient section where the current value is varied is not used for a display on a screen, a current control circuit comprising a fast response speed is required.

A current source circuit of a linear regulator type is used to provide electric power with a fast response speed and having no noise for a display device. That is, it is preferable that electric power is provided in a linear mode. However, in the case of a linear mode, a switching unit used for regulating voltage may be unable to control current flowing through LEDs when the characteristics of LEDs or the number of LEDs are altered or when the dispersion of LEDs is changed. Supplying sufficient power for the switching unit after considering all variable factors of LEDs may produce problems such as heat generation of an electric power supply circuit, reduce an efficiency of the electric power supply circuit, and make it difficult to control the electric power supply circuit.

IF a short-circuited and open-circuited status of LEDs is not well detected, the LEDs may not be controlled properly. For example, in the case of the short-circuited LEDs, the switching unit is overheated which may result in a fire.

Accordingly, there is a need for an improved display device capable of supplying a stable electric power for a light source.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a display device which supplies a stable electric power for a light source.

Another aspect of an exemplary embodiment of the present invention is to provide a display device which can detect a short-circuit or an open-circuit of a light source.

According to another aspect of an exemplary embodiment of the present invention, a display device comprising a plurality of light sources is provided. The display device comprises a variable electrical power supply, a switching unit, and a controller. The variable electrical power supply supplies electrical power for the light sources and the switching unit is connected in series with the light sources. The controller controls the variable electrical power supply so that voltage across both ends of the switching unit is consistently held in relation to voltage across both ends of the light sources.

According to an exemplary embodiment of the present invention, the controller comprises a reference voltage generator which generates a plurality of kinds of reference voltage according to a driven state of the light sources and a comparator which compares input voltage across both ends of the switching unit with the reference voltage.

According to an exemplary embodiment of the present invention, as the voltage across both ends of the switching unit is increased, the voltage across both ends of the light sources is decreased.

According to the exemplary embodiment of the present invention, the switching unit is a field effect transistor, and the reference voltage generator generates a first reference voltage with a level equal to or higher than that of the lowest voltage between a drain and a source of the field effect transistor where the field effect transistor is saturated at the time of the initial driving of the light sources.

According to an exemplary embodiment of the present invention, the controller controls the variable electrical power supply to supply power less than previously supplied power for the light sources when the case that the voltage across the switching unit is higher than the first reference voltage.

According to an exemplary embodiment of the present invention, the variable electrical power supply supplies power less than 5% to 15% of the first reference voltage. This is lower than the power which has been previously supplied for the light sources.

According to an exemplary embodiment of the present invention, the reference voltage generator sequentially generates a second reference voltage higher than the first reference voltage and a third reference voltage lower than the first reference voltage by a predetermined period.

According to an exemplary embodiment of the present invention, the controller controls the variable electrical power supply so that power is not supplied for the light sources when the voltage across the switching unit is higher than the second reference voltage.

According to an exemplary embodiment of the present invention, the controller controls the variable electrical power supply so that power is not supplied for the light sources when the voltage across the switching unit is lower than the third reference voltage.

According to an exemplary embodiment of the present invention, the reference voltage generator comprises a resistor string for voltage distribution and a plurality of switches connected with the resistor string.

According to an exemplary embodiment of the present invention, the switching unit comprises a field effect transistor or a bipolar junction transistor.

According to an exemplary embodiment of the present invention, the display device further comprises a current detection resistor which is connected between the switching unit and the ground.

According to an exemplary embodiment of the present invention, the display device further comprises a feedback unit which detects a current value of current flowing through the switching unit and controls the switching unit so that the detected current value is within a predetermined range.

According to an exemplary embodiment of the present invention, the light sources comprise light emitting diodes.

According to an exemplary embodiment of the present invention, the display device further comprises an illumination system, a display unit, a projection system, and a screen. The illumination system focuses light emitted from the light sources and the display unit receives the light from the illumination system and reproduces an image. The projection system enlarges and projects the image reproduced by the display elements and the displays the projected image.

According to an exemplary embodiment of the present invention, the display elements can comprise any one of DMD (Digital Micromirror Device) elements, LCOS (Liquid Crystal On Silicon) elements, or LCD (Liquid Crystal Display) elements.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
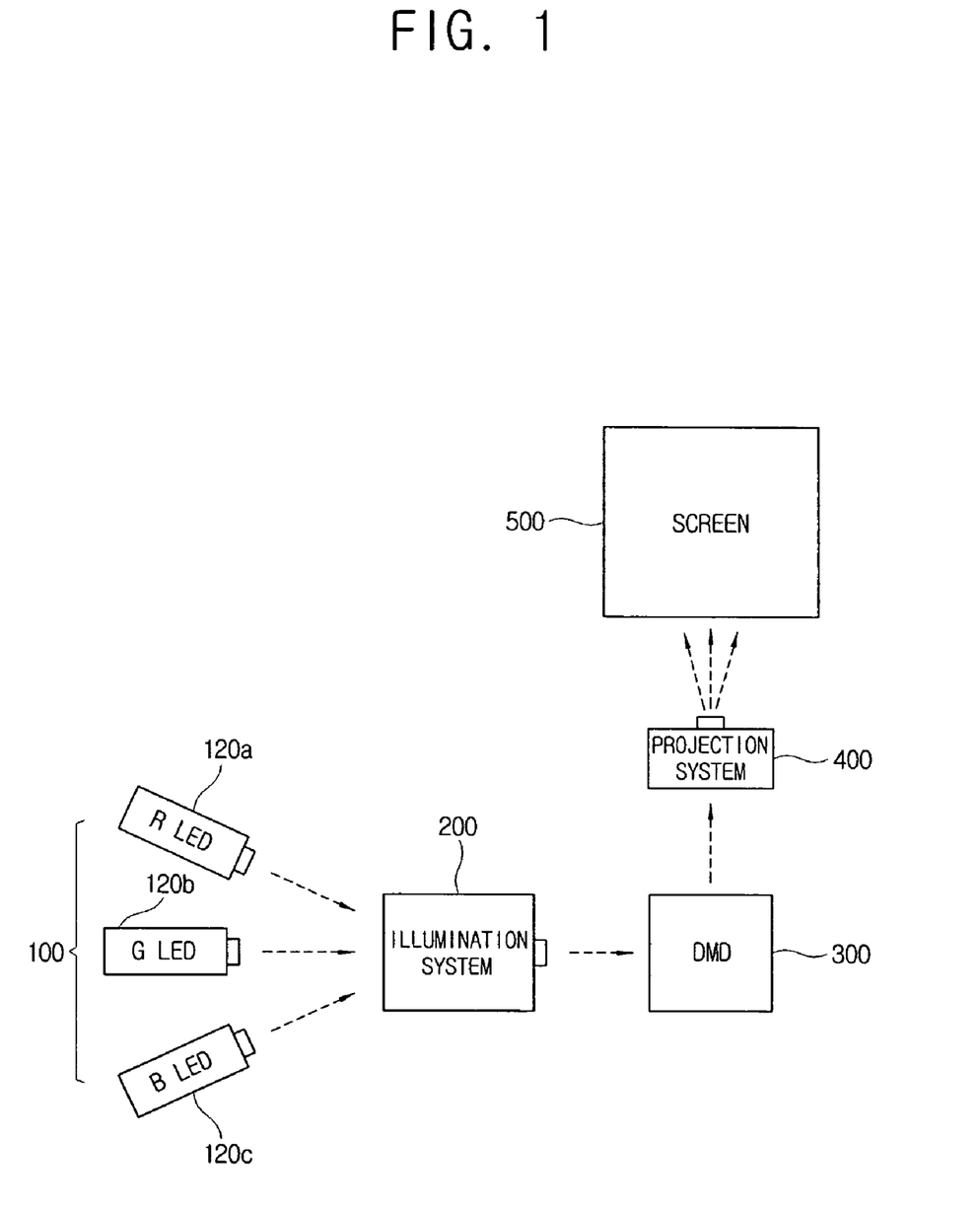
FIG. 1 is a schematic diagram showing a display device according to an exemplary embodiment of the present invention.

FIG. 1 is a schematic diagram showing a display device according to an exemplary embodiment of the present invention. Referring to FIG. 1, a display device includes a light source unit 100, an illumination system 200, a DMD (Digital Micromirror Device) 300 as a display unit, a projection system 400, and a screen 500.

The light source unit 100 provides light for the screen 500 in order to display an image on the screen 500. The light source unit 100, according to the exemplary embodiment of the present invention, includes a plurality of light emitting diodes (LEDs) 120a, 120b and 1200c. The LEDs 120a, 120b, and 120c emit red, green and blue, respectively, as light sources. It is preferable that LEDs are used as light sources.

The illumination system 200 focuses light which is separately input as Red (R), Green (G), and Blue (B), and changes the focused light into uniform parallel light, to then be transferred to the DMD 300.

A CRT (Cathode-Ray Tube), LCD (Liquid Crystal Display), or an LCOS (Liquid Crystal On Silicon) are primarily used as display units. According to an exemplary embodiment of the present invention, the DMD 300 including a number of micromirrors using an MEMS (Micro Electro Mechanical System) technology is used as a display unit.

The DMD 300 includes pixels which each have a number of micromirrors which are two-dimensionally aligned. The DMD 300 has a drive principle of driving gradients of mirrors into first and second angles according to an electrostatic system function of a memory device disposed in relation to each pixel and varying the angle of reflected light, thereby performing an on/off control of each micromirror. When the DMD 300 is used, a response speed is increased to reproduce moving pictures softer and smoother in comparison with those of LCD (Liquid Crystal Display) devices, or LCOS (Liquid Crystal On Silicon) devices.

The projection system 400 is provided with a plurality of lenses so that images reproduced by the DMD 300 are enlarged and projected on the screen 500.

The screen 500 has a rectangular shape on which images are actually displayed.

Figure 2:
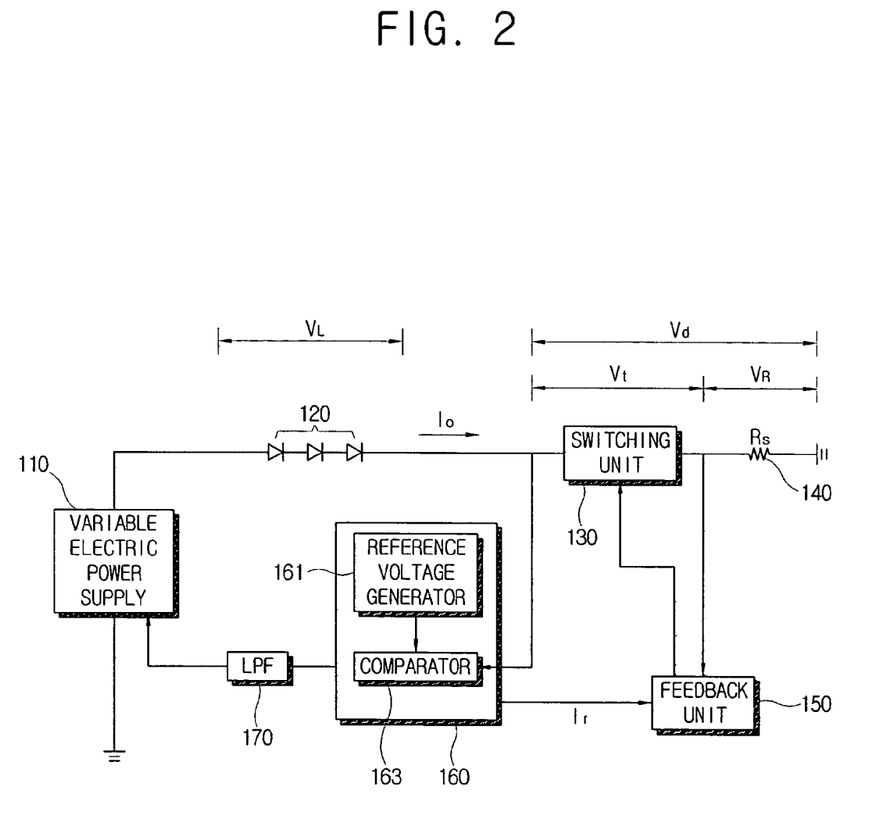
FIG. 2 is a block diagram illustrating a control operation of controlling a light source according to an exemplary embodiment of the present invention.

FIG. 2 is a block diagram illustrating a control operation of controlling a light source unit 100 according to an exemplary embodiment of the present invention. Referring to FIG. 2, the light source unit 100 includes a variable electrical power supply 110 which supplies electric power for light sources 120, a switching unit 130 which is connected in series with the light sources 120, a current detection resistor (Rs) 140 which is connected with the ground, a feedback unit 150 which is connected with the switching unit 130, a controller 160, and a LPF (Low Pass Filter) 170 which makes signals output from the controller 160 smoother.

The variable electrical power supply 110 is a power source which supplies contact electronic current to the light sources 120, and outputs variable voltage, which maintains a uniform voltage applied across both ends of the switching unit 130, to the light sources 120 by the controller 160. It is preferable that the variable electrical power supply 110 may vary power from a level higher than that of the maximum voltage which can be applied to the light sources 120 to a level lower than that of the minimum voltage which can be applied to the light sources 120. It is preferable that the variable electrical power supply 110 is a variable DC voltage source.

As shown in FIG. 1, the light sources 120 are composed of red, green and blue LEDs. LEDs included in the light sources 120 are not limited thereto, but the light sources may further include various colors of LEDs such as a cyan LED emitting cyan, a yellow LED emitting yellow, a magenta LED emitting magenta, and a white LED emitting white.

The switching unit 130 is connected in series with the light sources 120, and acts as a variable resistor which consumes a constant current supplied from the variable electrical power supply 110. The switching unit 130 preferably includes any one of a field effect transistor (FET) and a bipolar junction transistor (BJT) which are generally adopted in a constant current circuit. The switching unit 130 controls a signal applied to a gate electrode of the FET or a base electrode of the BJT, to thereby control current flowing between collector and emitter electrodes, or between drain and source electrodes. Accordingly, when a circuit including the FET or BJT is used, voltage supplied for a light source unit in a display device of a DLP system can be precisely controlled at a very fast switching speed without making noise. For example, a case in which an FET is used will be described below. The FET maintains current flowing between the drain and source of the FET as a constant value, irrespective of voltage applied between the drain and source of the FET. Therefore, constant current can be generated using such an FET property.

The current detection resistor 140 is connected between the switching unit 130 and the ground, and detects an amount of current (io) flowing through the switching unit 130. Generally, voltage VR applied across both ends of the current detection resistor 140 is ignored since the resistance value of the current detection resistor 140 is very small. Since the light sources 120, the switching unit 130 and the current detection resistor 140 are all connected in series, an amount of current (io) flowing through each element is identical.

The current detection resistor 140 is made of a resistor in order to detect current (io) flowing through the light sources 120 and the switching unit 130. However, a current detection circuit including a hall sensor may be used instead of the current detection resistor 140 in order to detect current (io).

The alignment of the light sources 120, the switching unit 130, and the current detection resistor 140 is not limited to a case shown in FIG. 2 and the connection sequence may be altered.

The feedback unit 150 detects current (io) flowing through the switching unit 130, and receives a current value (Ir) of a predetermined range which becomes a predetermined reference from the controller 160 to thereby control the switching unit 130 so that an amount of the detected current is within the predetermined range. An amount of voltage supplied from the variable electrical power supply 110 is maintained to be higher than a forward voltage drop (VL) of the overall light sources 120 to a degree. It is possible to control the detected current (io) to be within the predetermined range irrespective of the characteristics of the switching unit 130, or the supplied power and the forward voltage drop VL of the light sources 120. It is possible to receive a control signal for the current value (Ir) of the predetermined range from an external display unit that is not the controller 160.

The controller 160 includes a reference voltage generator 161 and a comparator 163, and controls the variable electrical power supply 110 so that voltage Vt across both ends of the switching unit 130 is maintained constant in relation to a change of voltage across both ends of the light sources 120.

In the case of a linear electrical power supply, voltage Vt applied to a variable resistor corresponding to the switching unit 130 is different, according to voltage VL applied across both ends of the light sources 120. The voltage Vt applied to the switching unit 130 corresponds to a value obtained by subtracting the voltage level applied to the light sources 120 from the voltage level of the supplied voltage. Here, as the voltage Vt increases, electric power consumed in the switching unit 130 increases. For example, when light sources 120 whose voltage drops are lower than those of the initially designed light sourcesare used, the number of the light sources 120 is reduced, and time elapses, and the characteristics of the light sources 120 are changed or damaged. Accordingly the voltage VL decreases, and the voltage Vt applied to the switching unit 130 increases. Thus, the switching unit 130 causes electric power loss, and it becomes difficult to control current (io).

Thus, although there are variables corresponding to the change in the circumstance or the alteration in the characteristics of the light sources 120, an exemplary embodiment of the present invention is characterized in that the voltage supplied to the light sources 120 is varied in order to maintain voltage across both ends of the switching unit 130 to be constant. The voltage across the switching unit 120 is set as a voltage level which minimizes electric power consumption.

The reference voltage generator 161 generates a plurality of different reference voltage according to a driven state of the light sources 120.

The reference voltage generator 161 according to the exemplary embodiment of the present invention periodically generates first reference voltage V1 at the time of initial driving of the light sources 120, and generates second reference voltage V2 and third reference voltage V3 at the time of normal driving of the light sources 120. Here, the first reference voltage V1 is the least voltage between the drain and the source where the field effect transistor is saturated. That is, the first reference voltage V1 can stably control current (io) flowing through the light sources 120, and is set as a value which minimizes electric power consumption. The second reference voltage V2 and the third reference voltage V3 are reference voltage values for detecting a short-circuit and open-circuit of the light sources 120 at the step where the light sources 120 are normally driven. A level of the second reference voltage V2 for detecting the short-circuit of the light sources 120 is set to be higher than that of the first reference voltage V1, and a level of the third reference voltage V3 for detecting the open-circuit of the light sources 120 is set to be lower than that of the first reference voltage V1.

Figure 3:
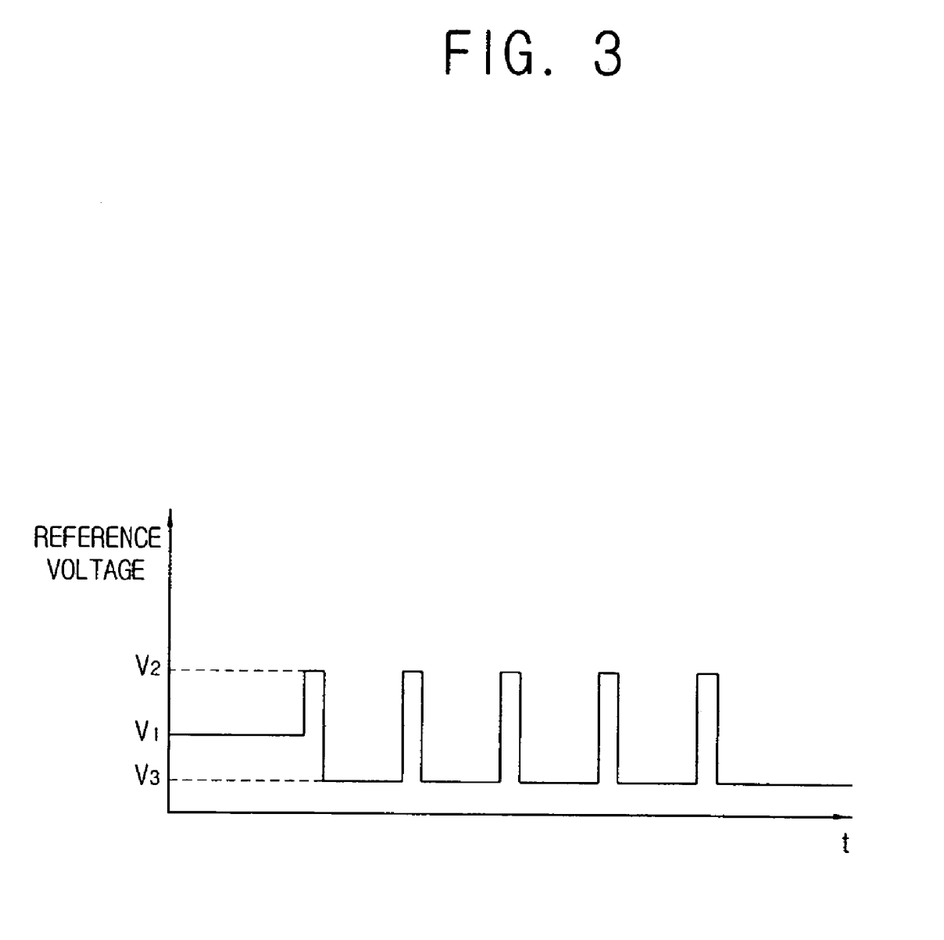
FIG. 3 is a waveform diagram showing a waveform output from a reference voltage generator according to an exemplary embodiment of the present invention.
Figure 4:
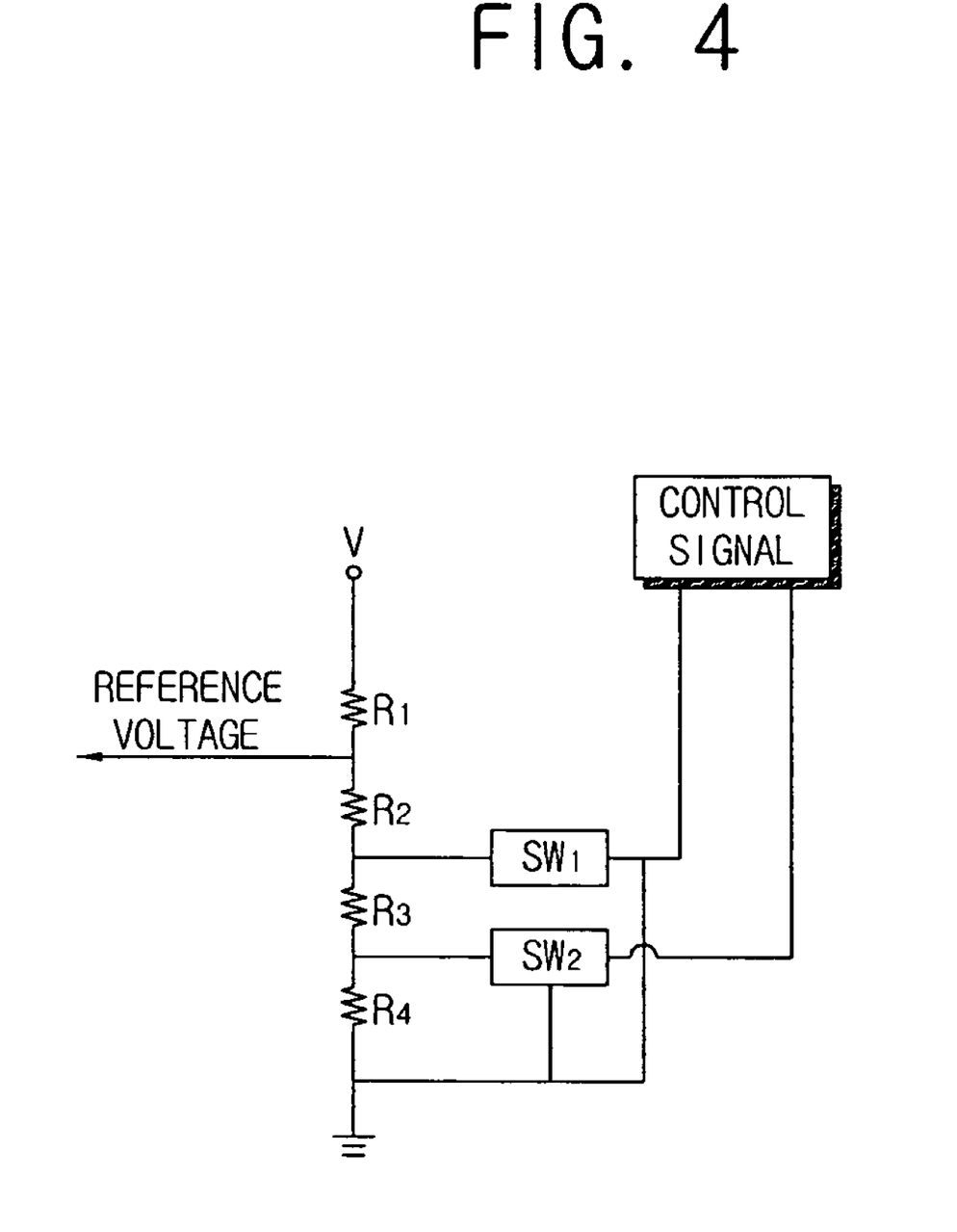
FIG. 4 is a schematic diagram showing a reference voltage generator according to an exemplary embodiment of the present invention.

FIG. 3 is a waveform diagram showing a waveform of reference voltage produced by the reference voltage generator 161. FIG. 4 is a schematic diagram showing the reference voltage generator 161 according to an exemplary embodiment of the present invention. Referring to FIG. 3, the first reference voltage V1 is output at the initial driving time, and thus an amount of voltage supplied from the variable electrical power supply 110 is controlled based on the first reference voltage V1. Thereafter, when the voltage level is stabilized and the light sources 120 are normally driven, the second reference voltage V2 for detecting the short-circuit of the light sources 120 and the third reference voltage V3 for detecting the open-circuit of the light sources 1120 are generated by a predetermined period. When the light sources 120 are short-circuited, an amount of electric power that is more than that of cases in which the light sources 120 are not short-circuited is consumed in the switching unit 130. Accordingly, the second reference voltage V2 is higher than the normal reference voltage V1. When the light sources 120 are open-circuited, an amount of electric power that is less than that of cases in which the light sources 120 are not open-circuited is consumed in the switching unit 130. Accordingly, the third reference voltage V3 is lower than the normal reference voltage V1.

Referring to FIG. 4, the reference voltage generator 161 includes a resistor string in which a plurality of resistors R1, R2, R3, and R4 are connected for voltage distribution, and a plurality of switches SW1 and SW2 connected between the resistors R1, R2, R3, and R4.

The switches SW1 and SW2 are turned on/off according to a predetermined control signal. A level of the reference voltage output is varied according to the on/off of the switches SW1 and SW2. It is assumed that the resistance values of the plurality of the resistors R1, R2, R3, and R4 are all the same and the voltage input to the resistor string is V. When the switches SW1 and SW2 are both turned off, the output reference voltage V (V*(R2+R3+R4)/(R1+R2+R3+R4)=V*3/4) has the highest level. When the switch SW1 connected between the resistors R2 and R3 is turned on, the output reference voltage V (V*R2/(R1+R2)=V*1/2) has the lowest level. When the switch SW2 connected between the resistors R3 and R4 is turned on, the output reference voltage V equals V*(R2+R3)/(R1+R2+R3) (=V*2/3). The thus-output reference voltage corresponds to the second reference voltage V2, the third reference voltage V3 and the first reference voltage V1 in sequence.

The reference voltage generator 161 is not limited to a voltage divider circuit including the resistor string and the switches, but may be modified into a system which receives and filters a PWM (Pulse Width Modulation) signal, or similar systems to the PWM signal filtering system. Also, the reference voltage generator 161 may be commonly used for the entire light sources 120. The reference voltage generator 161 may also be provided for each light source 120 which emits particular color light.

The comparator 163 compares input voltage across both ends of the switching unit 130 with the reference voltage output from the reference voltage generator 161. In this embodiment, the voltage input from the switching unit 130 to the comparator 163 is voltage Vd across the switching unit 130 from the ground not the voltage Vt. Since the resistance value of the current detection resistor 140 is very small, the voltage across both ends of the current detection resistor 140 is small. Thus, it is designed for easy detection that the voltage Vd applied to the switching unit 130 from the ground is input to the comparator 163. The light sources 120 and the switching unit 130 are connected in series. Accordingly, as the voltage Vd of the switching unit 130 increases, a determination is made that the voltage VL across both ends of the light sources 120 decreases.

When the result of a comparison between the voltage of the switching unit 130 and the reference voltage output from the reference voltage generator 161 in the comparator 163 is recognized, the controller 160 outputs a control signal which controls the variable electrical power supply 110.

The LPF 170 converts the control signal received from the controller 160 into a signal which can be read by the variable electrical power supply 110. In this embodiment, the controller 160 is a digital logic circuit which may be implemented by a DSP (Digital Signal Processor) or a FPGA (Field Programmable Gate Array). The LPF 170 plays a role of filtering a PWM signal output from the controller 160 and extracting a DC (direct current) component.

The LPF 170 may be replaced by a DAC (Digital to Analog Converter) which converts a digital signal into an analog signal. As required, an ADC (Analog to Digital Converter) which converts a signal input to the controller 160 into a digital signal may be further used. Also, it is possible to design the controller 160 into an analog circuit other than a digital circuit.

Figure 5:
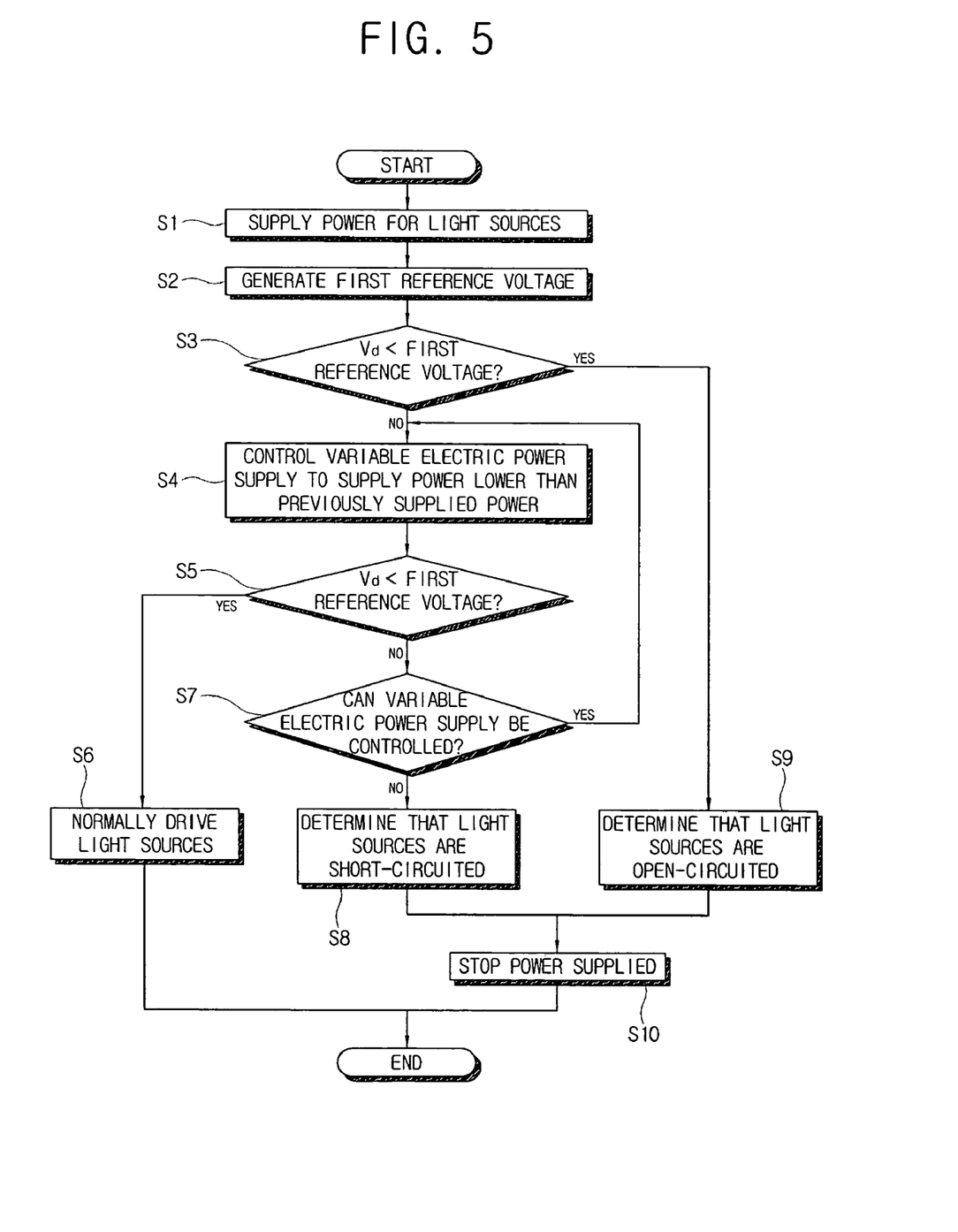
FIG. 5 is a flowchart illustrating a control process of controlling power for a light source when a display device is initially driven according to an exemplary embodiment of the present invention.
Figure 6:
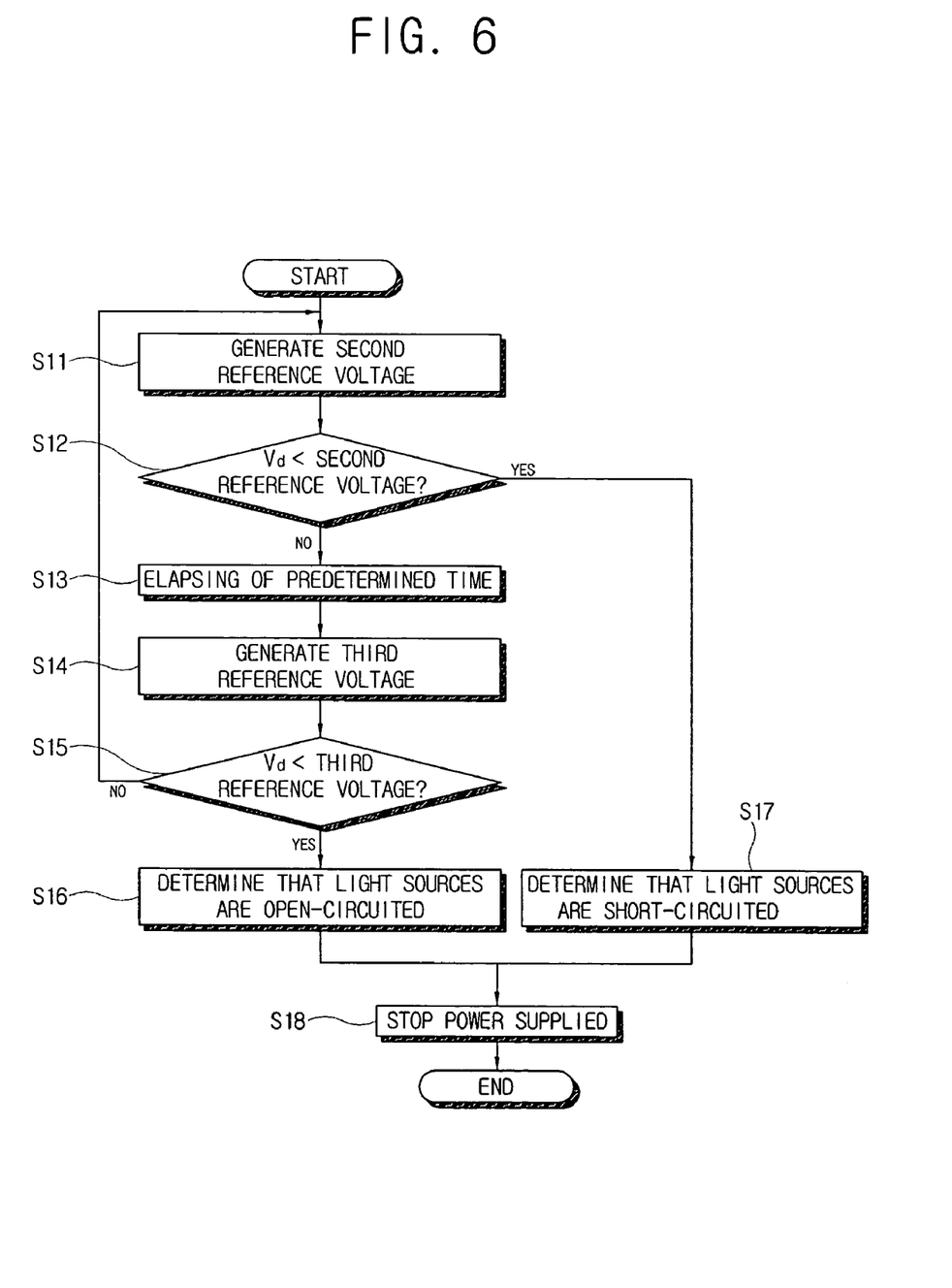
FIG. 6 is a flowchart illustrating a control process of controlling power for a light source when a display device is normally driven according to an exemplary embodiment of the present invention.

The power control for the light sources according to the exemplary embodiment of the present invention will be described with reference to FIGS. 5 and 6. FIG. 5 is a flowchart of a method of controlling power for a light source 120 when a display device is initially driven. FIG. 6 is a flowchart of a method of controlling power for a light source when a display device is normally driven.

First, referring to FIG. 5, when initial voltage is supplied for a display device, the voltage is supplied to the light sources 120 (S1). The reference voltage generator 161 in the controller 160 generates the first reference voltage V1 (S2). The comparator 163 compares the input voltage Vd with the first reference voltage V1 (S3).

If the input voltage Vd is higher than the first reference voltage V1, the controller 160 outputs a predetermined control signal to lower the voltage applied to the switching unit 130, and the variable electrical power supply 110 outputs voltage lower than the previously supplied voltage (S4). It is preferable that the magnitude of the voltage regulated by the variable electrical power supply 110 is sufficiently lower than the first reference voltage V1. To prevent a difference between the detected voltage Vd and the first reference voltage V1 from being large at an instant time when the detected voltage Vd is lower than the first reference voltage V1, the variable electrical power supply 110 supplies voltage lowered by 5% to 15% of the first reference voltage V1. This is lower than the initially supplied voltage.

After the controlled voltage has been supplied, voltage Vd is detected again, and then detected voltage Vd is compared with the first reference voltage V1 (S5). By a comparison result, when the detected voltage Vd is lower than the first reference voltage V1, a determination is made that the power supplied for the light sources 120 is stable, to then drive the light sources 120 normally (S6).

When the detected voltage Vd is higher than the first reference voltage V1, a determination is made as to whether or not the power supplied from the variable electrical power supply 110 must be controlled (S7). Although the variable electrical power supply may not be controlled since the supplied power has been sufficiently lowered, if the detected voltage Vd is higher than the first reference voltage V1, the controller 160 determines that at least a part of a plurality of light sources 120 are short-circuited (S8), and stops the power supplied (S10).

Referring back to step S3, if the input voltage Vd is lower than the first reference voltage V1, the controller 160 determines that at least a part of a plurality of light sources 120 are open-circuited (S9). The controller then stops the power supplied (S10) even though the voltage Vd to the comparator 163 input should have been higher than the first reference voltage V1 since the initially supplied power had been sufficiently large.

Power may be stably supplied by this process when the light sources 120 are initially driven.

The power control during normal driving of the light sources 120 will be described below. The reference voltage generator 161 generates a second reference voltage V2 higher than the first reference voltage V1 (S11). The comparator 163 compares the second reference voltage V2 with the detected voltage Vd (S12).

By a comparison result, when the detected voltage Vd is higher than the second reference voltage V2, a determination is made that the light sources 120 are short-circuited (S17) and makes the power supplied stop (S18).

When the detected voltage Vd is lower than the second reference voltage V2, a determination is made that the light sources 120 are not short-circuited: After an amount of predetermined time elapses (S13), the third reference voltage V3 lower than the first reference voltage V1 is generated (S14). Then, the third reference voltage V3 is compared with the detected voltage Vd (S15). When the detected voltage Vd is higher than the third reference voltage V3, the process is returned to step 11 in order to generate the second reference voltage V2 again. If the detected voltage Vd is lower than the third reference voltage V3, a determination is made that the light sources 120 are open-circuited (S16), and stops the power supplied (S18). Accordingly, an exemplary embodiment of the present invention facilitates the detection of whether the light sources 120 are to be short-circuited and open-circuited consistently even in the process of normal driving of the light sources 120. As a result, when a problem occurs, the power supply can be effectively controlled.

As described above, an exemplary embodiment of the present invention provides a display device which provides a stable electrical power supply for a light source unit.

In addition, an exemplary embodiment of the present invention provides a display device which can detect a short-circuit or an open-circuit of a light source unit.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A display device comprising a plurality of light sources, the display device comprising:
    a variable electrical power supply for supplying electric power for the light sources;
    a switching unit which is connected in series with the light sources; and
    a controller for controlling the variable electrical power supply whereby voltage across both ends of the switching unit is consistently held in relation to voltage across both ends of the light sources.

2. The display device of claim 1, wherein the controller comprises: a reference voltage generator which generates a plurality of reference voltages according to a driven state of the light sources; and a comparator which compares input voltage across both ends of the switching unit with the reference voltage.

3. The display device of claim 2, wherein as the voltage across both ends of the switching unit is increased, the voltage across both ends of the light sources is decreased.

4. The display device of claim 2, wherein the switching unit comprises a field effect transistor, and the reference voltage generator generates a first reference voltage comprising a level which is at least one of equal to and higher than that of the least voltage between a drain and a source of the field effect transistor where the field effect transistor is saturated at the time of initial driving of the light sources.

5. The display device of claim 4, wherein the controller controls the variable electrical power supply to supply power lower than power which has been previously supplied for the light sources, wherein the voltage across the switching unit is higher than the first reference voltage.

6. The display device of claim 5, wherein the variable electrical power supply supplies power less than 5% to 15% of the first reference voltage than the power which has been previously supplied for the light sources.

7. The display device of claim 2, wherein the reference voltage generator sequentially generates a second reference voltage of a level higher than that of the first reference voltage, and a third reference voltage of a level lower than that of the first reference voltage by a reference period.

8. The display device of claim 7, wherein the controller controls the variable electrical power supply whereby power is not supplied for the light sources in the case that the voltage across the switching unit is higher than the second reference voltage.

9. The display device of claim 7, wherein the controller controls the variable electrical power supply whereby power is not supplied for the light sources in the case that the voltage across the switching unit is lower than the third reference voltage.

10. The display device of claim 2, wherein the reference voltage generator comprises a resistor string for voltage distribution, and a plurality of switches connected with the resistor string.

11. The display device of claim 1, wherein the switching unit comprises at least one of a field effect transistor and a bipolar junction transistor.

12. The display device of claim 1, further comprising a current detection resistor which is connected between the switching unit and the ground.

13. The display device of claim 1, further comprising a feedback unit which detects a current value of current flowing through the switching unit and controls the switching unit whereby the detected current value is within a range.

14. The display device of claim 1, wherein the light sources comprise light emitting diodes.

15. The display device of claim 1, further comprising:
    an illumination system for focusing light emitted from the light sources;
    a display unit for receiving light from the illumination system and for reproducing an image;
    a projection system for enlarging and projecting the image reproduced by the display elements; and
    a screen for displaying the projected image.

16. The display device of claim 15, wherein the display elements comprise any one of DMD (Digital Micromirror Device) elements, LCOS (Liquid Crystal On Silicon) elements, and LCD (Liquid Crystal Display) elements.

17. A control method of a display device comprising a plurality of light sources, the method comprising:
    supplying electric power for the light sources;
    connecting a switching unit in series with the light sources; and
    controlling a variable electrical power supply whereby voltage across both ends of the switching unit is consistently held in relation to voltage across both ends of the light sources.

18. The control method of the display device according to claim 17, wherein the method comprises generating a plurality of reference voltages according to a driven state of the light sources and comparing an input voltage across both ends of the switching unit with the reference voltage.

* * * * *